(12) United States Patent  
Kluge

(10) Patent No.: US 8,380,387 B2  
(45) Date of Patent: Feb. 19, 2013

(54) METHOD AND SYSTEM FOR DETECTING INCREASED INTERNAL FRICTION IN A STEERING MECHANISM

(75) Inventor: Torsten Kluge, Overath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 12/766,873

(22) Filed: Apr. 24, 2010

(65) Prior Publication Data

US 2010/0274437 A1 Oct. 28, 2010

(30) Foreign Application Priority Data

Apr. 23, 2009 (DE) .................. 10 2009 002 594

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |

(52) U.S. Cl. .................. 701/29.1; 701/30.8; 701/36

(58) Field of Classification Search ................. None  
See application file for complete search history.

(56) References Cited

U.S. PATENT DOCUMENTS

| 6,205,382 B1* | 3/2001 | Suissa ............................. 701/41 |
| 6,856,886 B1* | 2/2005 | Chen et al. ...................... 701/70 |
| 2011/0153160 A1* | 6/2011 | Hesseling et al. ............... 701/41 |

* cited by examiner

*Primary Examiner* — Paul Danneman  
(74) *Attorney, Agent, or Firm* — Joseph E. Root

(57) ABSTRACT

A method and system for detecting increased internal friction in a steering mechanism of a vehicle having a steering system including a steering linkage and a steering wheel. The method includes detecting a steering acceleration $\ddot{\varphi}_L$ value of an element of the steering system and comparing the steering acceleration $\ddot{\varphi}_L$ value with a stored maximum steering acceleration threshold value $\ddot{\varphi}_{n,\,max}$. Based on the comparison, if the steering acceleration $\ddot{\varphi}_L$ value is greater than the maximum steering acceleration threshold value $\ddot{\varphi}_{n,\,max}$, the method generates at least one first signal r1 for further processing. The method may further include counting a number of events n occurring owning to the first signal r1 and comparing n with a possible maximum number of events nmax. If n is greater than nmax, the method generates a second signal r2.

18 Claims, 1 Drawing Sheet

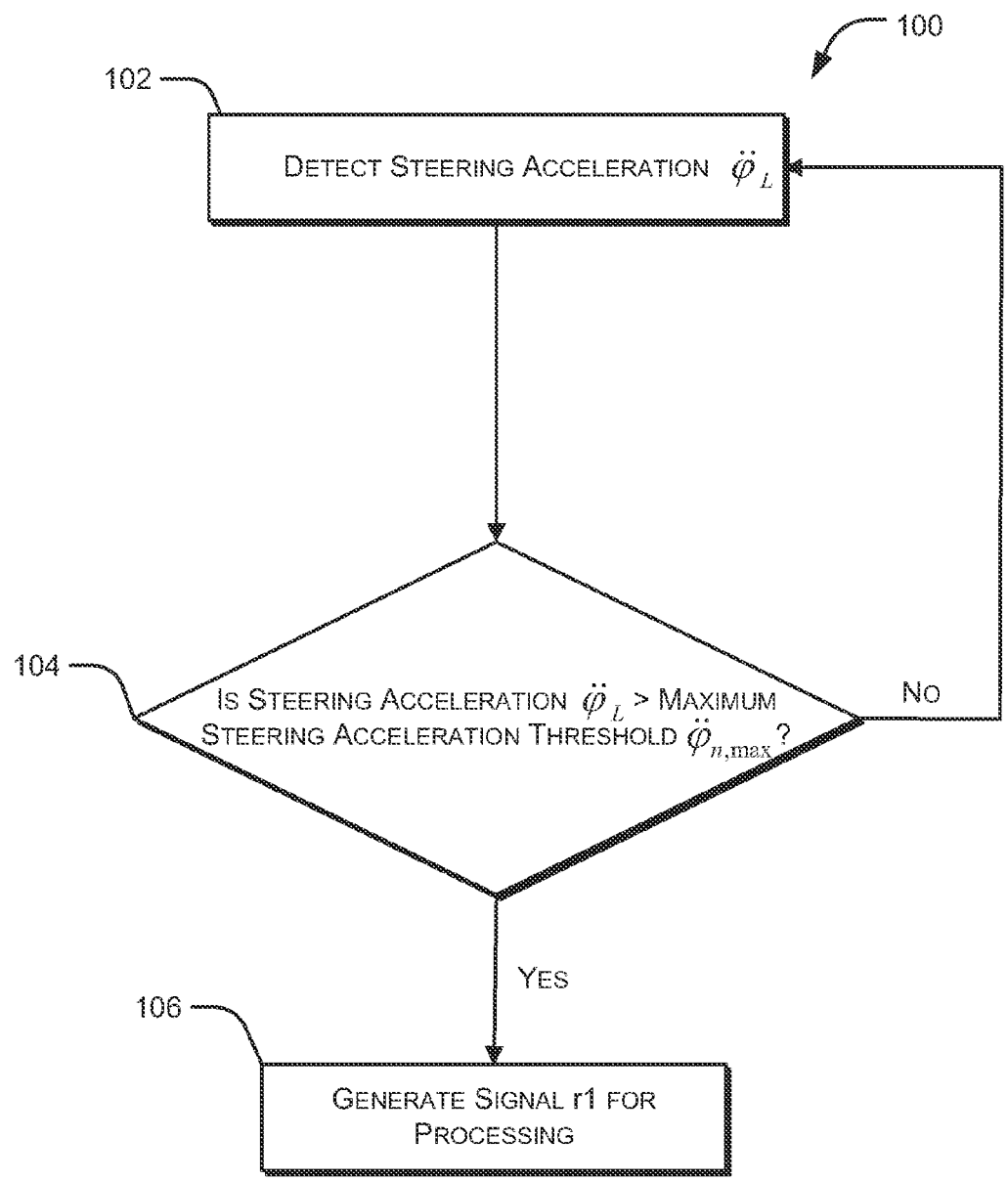

METHOD AND SYSTEM FOR DETECTING INCREASED INTERNAL FRICTION IN A STEERING MECHANISM

BACKGROUND

The application relates generally to power-assisted vehicle steering mechanisms, and more particularly to safety aspects of power-assisted vehicle steering mechanisms.

Modern vehicles are equipped with electronic safety systems, which provide assistance to a driver. In addition to the widespread ABS (anti-lock braking system) and airbag system, ESC (Electronic Stability Control) has assumed great importance. An ESC system is capable of individually controlling and braking each wheel of a vehicle and of preventing over-steering or under-steering while considering measurement signals from several sensors. An ESC system can automatically perform active steering interventions and superpose them on the steering actions of the driver.

An increase in internal friction within an EPAS (Electric Power Assisted Steering) geared motor due to wear or contamination can lead to malfunctions in the EPAS system or the ESC system. The system could incorrectly interpret the internal friction fault as originating from external driving conditions, and as a result, generate incorrect controlling instructions to the EPAS or ESC system.

Further, present systems would benefit from detection of inadequate tire traction, caused by external factors, such as ice, water, or oil on the road surface Although current EPAS or ESC systems are equipped with a number of sensors, the sensors may not reliably identify inadequate tire traction or high internal friction conditions within the steering mechanism. Further, the integrated microprocessor system has limited computing and storage resources, leaving little computing capacity available for the detection of such conditions.

A known solution provides a system and method for determining excessively low tire traction and increased internal friction within the steering mechanism of a vehicle. Here, the angular acceleration of the steering wheel and the speed of the vehicle are detected, and the angular acceleration is compared with stored minimum or maximum tabulated threshold values for the respective traveling speeds. Such a system is suitable only for slowly proceeding, low-frequency events but does not perform satisfactorily during event sequences of higher frequency.

Moreover, the computation-intensive data processing methods of EPAS or ESC systems lay claim to limited resources, leaving little capacity available for additional computing tasks.

It would be highly desirable to have a method for determining increased internal friction within a steering mechanism of a vehicle, even during high-frequency event sequences while utilizing minimum system resources.

SUMMARY

One embodiment of the present application describes a method for detecting increased internal friction in a steering mechanism of a vehicle, having a steering system including a steering linkage and a steering wheel. The method detects a steering acceleration $\ddot{\phi}_L$ value of an element of the steering system and compares the steering acceleration $\ddot{\phi}_L$ value with a stored maximum steering acceleration threshold value $\ddot{\phi}_{n,\,max}$. If the steering acceleration $\ddot{\phi}_L$ value is greater than the maximum steering acceleration threshold value $\ddot{\phi}_{n,\,max}$, the method generates a first signal r1 for further processing.

Another embodiment of the application describes a safety and warning system for determining increased internal friction of a steering mechanism of a vehicle, having a steering system including a steering linkage and a steering wheel. The system includes a detector for detecting a steering acceleration $\ddot{\phi}_L$ value of an element of the steering system. A comparator compares the steering acceleration $\ddot{\phi}_L$ value with a stored maximum steering acceleration threshold value $\ddot{\phi}_{n,\,max}$. The system further includes a first signal generator for generating at least one first signal r1 for further processing, if the steering acceleration $\ddot{\phi}_L$ value is greater than the maximum steering acceleration threshold value $\ddot{\phi}_{n,\,max}$.

BRIEF DESCRIPTION OF THE DRAWINGS

The FIGURE described below set out and illustrate a number of exemplary embodiments of the disclosure. Throughout the drawings, like reference numerals refer to identical or functionally similar elements. The drawings are illustrative in nature and are not drawn to scale.

FIG. 1 illustrates a flowchart of an exemplary embodiment of a method for determining increased internal friction within a steering mechanism of a vehicle.

DETAILED DESCRIPTION

The following detailed description is made with reference to the FIGURE. Exemplary embodiments are described to illustrate the subject matter of the disclosure, not to limit its scope, which is defined by the appended claims.

In general, the present disclosure describes systems and methods for determining increased internal friction within a steering mechanism of a vehicle, even during event sequences of higher frequency while utilizing minimum system resources.

FIG. 1 illustrates a flowchart of an exemplary embodiment of method 100 for determining increased internal friction of a steering mechanism of a vehicle. The vehicle has a steering system including a steering linkage and a steering wheel. At step 102, the method 100 detects the steering acceleration $\ddot{\phi}_L$ of an element of the steering system, such as the steering linkage or the steering wheel. At step 104, the steering acceleration $\ddot{\phi}_L$ obtained is compared with a stored maximum steering acceleration threshold value $\ddot{\phi}_{n,\,max}$. In one embodiment, the maximum steering acceleration threshold value $\ddot{\phi}_{n,\,max}$ is independent of the traveling speed of the vehicle. If the detected steering acceleration $\ddot{\phi}_L$ is below the maximum steering acceleration threshold value $\ddot{\phi}_{n,\,max}$, the method 100 returns to step 102, and the acceleration detection is repeated. Alternatively, at step 106, a first signal r1 is generated and made available for further processing, if the steering acceleration ($\ddot{\phi}_L$) is greater than the maximum steering acceleration threshold value ($\ddot{\phi}_{n,\,max}$).

The steering acceleration ($\ddot{\phi}_L$) may be detected by using sensors arranged in the steering mechanism, such as a steering wheel rotational angle sensor, a position sensor, a speed sensor, or an acceleration sensor.

In certain implementations, the further processing includes conveying the first signal r1 as a warning to the driver, informing her about an existing fault in the steering mechanism. Further, the first signal r1 may be passed to electronic systems, such as an EPAS system or an ESC system in order, for example, to switch the system off, preventing misinterpretation of the detected acceleration, and thereby informing the electronic systems that the increased acceleration values may be ignored. The switching off may be temporary or permanent.

It has been established experimentally that excessively high internal friction may lead to sudden jerky effects due to loss of tire fraction, which can become perceptible in some circumstances as creaking or humming. The jerky effects result in the angular acceleration of the steering wheel assuming unusually high peak values. For a short time, the angular acceleration reaches a level that is substantially higher than the angular accelerations occurring in a steering wheel system free from interference. The disclosed embodiments can identify the excessively high internal friction of the steering system and further, the internal friction of the steering system may be determined directly from the detected increased absolute value of the angular acceleration of the steering wheel.

The maximum steering acceleration threshold value $\ddot{\phi}_{n, max}$ is determined such that the increased internal friction can be identified. The resistances caused by increased internal friction may be interpreted as effects of adhesion and sliding that can lead to large discontinuous changes in the steering acceleration, as a consequence of steering force applied to the steering system. The high friction slows the steering movement in the steering mechanism, building a stronger force or torque. The frictional resistance is overcome instantaneously, and the steering acceleration grows in a jerky, discontinuous manner. This high, rapid growth in steering acceleration lies above the range of values of normal steering accelerations, and thus can be attributed to increased internal friction resulting from adhesion and sliding.

The maximum steering acceleration threshold value $\ddot{\phi}_{n, max}$ may be set to a value substantially higher than the maximum steering acceleration occurring in a steering mechanism subjected to normal internal friction. In certain implementations, an absolute value is determined through experimentation.

In order to distinguish random interference events from actual interference events, in one embodiment of the disclosure, the number of events n occurring due to the generated signal r1 is counted. A maximum number of events nmax is detected and compared with n. A second signal r2 is generated, if n is greater than nmax, and made available to the electronic systems. In a further embodiment, nmax is detected and compared within a predetermined time period.

In some embodiments, the first signal r1 and the second signal r2 are subjected to time or frequency based processing to obtain information related to time or frequency. In one embodiment, the first signal r1 and the second signal r2 are subjected to a low-pass or a high-pass filter during time or frequency processing.

A method according to the embodiments of the disclosure may be combined with a method present in a vehicle for determining excessively low tire traction. Further, a method according to the embodiments of the disclosure may be combined with another method for determining increased internal friction within the steering mechanism of a vehicle. The other method for determining increased internal friction within the steering mechanism may be directed to determining frictional interference due to other causes, and therefore a plurality of causes can be ascertained.

The present disclosure also provides a safety and warning system for determining increased internal friction of a steering mechanism of a vehicle The system includes a detector to detect a steering acceleration $\ddot{\phi}_L$ value of an element of the steering system and a comparator to compare the steering acceleration $\ddot{\phi}_L$ value with a stored maximum steering acceleration threshold value $\ddot{\phi}_{n, max}$. In one embodiment, the maximum steering acceleration threshold value $\ddot{\phi}_{n, max}$ is independent of the traveling speed of the vehicle. A first signal generator generates a first signal r1 for further processing, if the steering acceleration $\ddot{\phi}_L$ value is greater than the maximum steering acceleration threshold value $\ddot{\phi}_{n, max}$. In one embodiment, the first signal r1 is used to display a warning signal for the vehicle driver.

In certain embodiments, the system includes a second signal generator that counts a number of events n occurring due to the first signal r1 and detects a possible maximum number of events nmax. The second signal generator compares n with nmax and generates a second signal r2, if n is greater than nmax. In a further embodiment, nmax is detected and compared with n within a predetermined time period.

The system may employ sensors, arranged within the steering mechanism, to detect the steering acceleration $\ddot{\phi}_L$, such as a steering wheel rotational angle sensor, a position sensor, a speed sensor, or an acceleration sensor.

In some embodiments, as noted for the method 100, the maximum steering acceleration threshold value $\ddot{\phi}_{n, max}$ is substantially higher than the maximum steering acceleration $\ddot{\phi}_L$ occurring when the steering mechanism is subjected to normal internal friction.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for determining increased internal friction of a steering mechanism of a vehicle, having a steering mechanism including a steering linkage and a steering wheel, the method comprising:

detecting a steering acceleration ($\ddot{\phi}_L$) value of one of the steering wheel and the steering linkage of the steering system, using a sensor operatively coupled to the steering mechanism;

comparing the steering acceleration ($\ddot{\phi}_L$) value with a stored maximum steering acceleration threshold value ($\ddot{\phi}_{n, max}$), the maximum steering acceleration threshold value being independent of a speed of travel of the vehicle; and if the steering acceleration ($\ddot{\phi}_L$) value is greater than the maximum steering acceleration threshold value ($\ddot{\phi}_{n, max}$), then generating at least one first signal ($r_1$) for further processing.

2. A method of claim 1, wherein the maximum steering acceleration threshold value ($\ddot{\phi}_{n, max}$) is substantially higher than the maximum steering acceleration ($\ddot{\phi}_L$) occurring when the steering mechanism is subjected to normal internal friction.

3. The method of claim 1, wherein the first signal ($r_1$) is used to display a warning signal for the vehicle driver.

4. The method of claim 1, wherein the first signal ($r_1$) is passed to an Electric Power Assist Steering (EPAS) system.

5. The method of claim 1, wherein the first signal ($r_1$) is passed to an Electronic Stability Control (ESC) system.

6. The method of claim 1 further comprising:

counting a number of events (n) occurring owing to the first signal ($r_1$);

detecting a possible maximum number of events ($n_{max}$);

comparing (n) with ($n_{max}$); and generating a second signal ($r_2$), if (n) is greater than ($n_{max}$).

7. The method of claim 6, wherein ($n_{max}$) is detected and compared with (n) within a predetermined time period ($\Delta t$).

8. The method of claim 6, wherein the first signal ($r_1$) and the second signal ($r_2$) are provided to a low-pass filter.

9. The method of claim 6, wherein the first signal ($r_1$) and the second signal ($r_2$) are provided to a high-pass filter.

10. The method of claim 1, wherein the steering acceleration ($\ddot{\phi}_L$) is detected by using one or more of:
    a steering wheel rotational angle sensor;
    a position sensor;
    a speed sensor; or
    an acceleration sensor;
    wherein the one or more sensors are operatively coupled to the steering mechanism.

11. The method of claim 1 further comprising determining a low level of tire traction.

12. The method of claim 1 further comprising determining increase in internal friction within the steering mechanism of the vehicle.

13. A safety and warning system for determining increased internal friction of a steering mechanism of a vehicle, having a steering system including a steering linkage and a steering wheel, the system comprising:
    a sensor operatively coupled to the steering mechanism and configured to detect a steering acceleration ($\ddot{\phi}_L$) value of one of the steering wheel and the steering linkage of the steering system;
    a processor configured to compare the steering acceleration ($\ddot{\phi}_L$) value with a stored maximum steering acceleration threshold value ($\ddot{\phi}_{n,\,max}$), the maximum steering acceleration threshold value being independent of a speed of travel of the vehicle; and
    a first signal generator configured to generate at least one first signal ($r_1$) for further processing, if the steering acceleration ($\ddot{\phi}_L$) value is greater than the maximum steering acceleration threshold value ($\ddot{\phi}_{n,\,max}$).

14. The system of claim 13, wherein the first signal ($r_1$) is used to display a warning signal for the vehicle driver.

15. The system of claim 13 further comprising a second signal generator configured to:
    count a number of events (n) occurring owing to the first signal ($r_1$);
    detect a possible maximum number of events ($n_{max}$);
    compare (n) with ($n_{max}$); and
    generate a second signal ($r_2$), if (n) is greater than ($n_{max}$).

16. The system of claim 15, wherein ($n_{max}$) is detected and compared with (n) within a predetermined time period ($\Delta t$).

17. The system of claim 13 further comprising one or more of:
    a steering wheel rotational angle sensor;
    a position sensor;
    a speed sensor; or
    an acceleration sensor;
    wherein the one or more sensors are employed to detect the steering acceleration ($\ddot{\phi}_L$) and are operatively coupled to the steering mechanism.

18. The system of claim 13, wherein the maximum steering acceleration threshold value ($\ddot{\phi}_{n,\,max}$) is substantially higher than the maximum steering acceleration ($\ddot{\phi}_L$) occurring when the steering mechanism is subjected to normal internal friction.

* * * * *